United States Patent
Duong et al.

(10) Patent No.: US 9,726,084 B2
(45) Date of Patent: Aug. 8, 2017

(54) COMPRESSOR BLEED SELF-RECIRCULATING SYSTEM

(71) Applicant: PRATT & WHITNEY CANADA CORP., Longueuil (CA)

(72) Inventors: Hien Duong, Mississauga (CA); Jason Nichols, Mississauga (CA); Peter Townsend, Mississauga (CA); Vijay Kandasamy, Tamil Nadu (IN)

(73) Assignee: PRATT & WHITNEY CANADA CORP., Longueuil (CA)

( * ) Notice: Subject to any disclaimer, the term of this patent is extended or adjusted under 35 U.S.C. 154(b) by 656 days.

(21) Appl. No.: 13/803,418

(22) Filed: Mar. 14, 2013

(65) Prior Publication Data

US 2014/0271108 A1    Sep. 18, 2014

(51) Int. Cl.
| | |
|---|---|
| *F02C 9/18* | (2006.01) |
| *F01D 5/14* | (2006.01) |
| *F04D 29/52* | (2006.01) |
| *F04D 29/68* | (2006.01) |
| *F04D 27/02* | (2006.01) |

(52) U.S. Cl.
CPC ............... *F02C 9/18* (2013.01); *F01D 5/145* (2013.01); *F04D 27/023* (2013.01); *F04D 29/526* (2013.01); *F04D 29/682* (2013.01)

(58) Field of Classification Search
CPC .... F04D 29/526; F04D 29/682; F04D 27/023; F04D 27/009; F04D 27/02; F04D 27/0207; F04D 27/0215; F04D 27/0238; F04D 29/68; F04D 29/681; F04D 29/684; F04D 29/685; F02C 9/18; F01D 5/145
See application file for complete search history.

(56) References Cited

U.S. PATENT DOCUMENTS

| | | |
|---|---|---|
| 2,720,356 A | 10/1955 | Erwin |
| 3,462,071 A | 8/1969 | Garve |
| 3,993,414 A | 11/1976 | Meauze et al. |
| 4,479,755 A | 10/1984 | Skoe |
| 4,930,978 A | 6/1990 | Khanna et al. |
| 5,059,093 A | 10/1991 | Khalid et al. |
| 5,209,633 A | 5/1993 | McGreehan et al. |

(Continued)

FOREIGN PATENT DOCUMENTS

EP          0229519          7/1987

*Primary Examiner* — Bryan Lettman
(74) *Attorney, Agent, or Firm* — Norton Rose Fulbright Canada LLP

(57) ABSTRACT

A compressor for a gas turbine engine having a bleed air recirculation system includes a plurality of bleed holes extending through the shroud at a first axial location thereon substantially adjacent the blade tips. The bleed holes have a closed outer perimeter along their complete length. An annular bleed cavity surrounds the shroud and is in communication with outlet openings of the bleed holes. The bleed holes provide communication between the main gas flow passage and the bleed cavity. The bleed cavity includes exit passages having outlets disposed in the shroud at a second axial location which is upstream of both the first axial location and the leading edge of the blades of the rotor. Bleed air is passively bled from the main gas flow passage via the bleed holes, recirculated through the bleed cavity and re-injected back into the main gas flow passage at the second axial location.

20 Claims, 5 Drawing Sheets

(56) References Cited

U.S. PATENT DOCUMENTS

| | | |
|---|---|---|
| 5,282,718 A | 2/1994 | Koff et al. |
| 5,351,478 A | 10/1994 | Walker et al. |
| 5,707,206 A | 1/1998 | Goto et al. |
| 5,904,470 A | 5/1999 | Kerrebrock et al. |
| 6,183,195 B1 | 2/2001 | Tremaine |
| 6,325,595 B1 | 12/2001 | Breeze-Stringfellow et al. |
| 6,428,271 B1 | 8/2002 | Ress, Jr. et al. |
| 6,783,324 B2 | 8/2004 | Muny |
| 7,090,462 B2 * | 8/2006 | Martin et al. ................. 415/144 |
| 7,147,426 B2 | 12/2006 | Leblanc et al. |
| 7,549,838 B2 | 6/2009 | Touyeras |
| 8,382,422 B2 | 2/2013 | Guemmer |
| 2002/0106274 A1 | 8/2002 | Sumser et al. |
| 2005/0249578 A1 * | 11/2005 | Leblanc et al. ................... 415/1 |
| 2006/0153673 A1 * | 7/2006 | Guemmer .................... 415/115 |
| 2009/0324384 A1 | 12/2009 | Seitz et al. |
| 2010/0111688 A1 | 5/2010 | Nolcheff et al. |

* cited by examiner

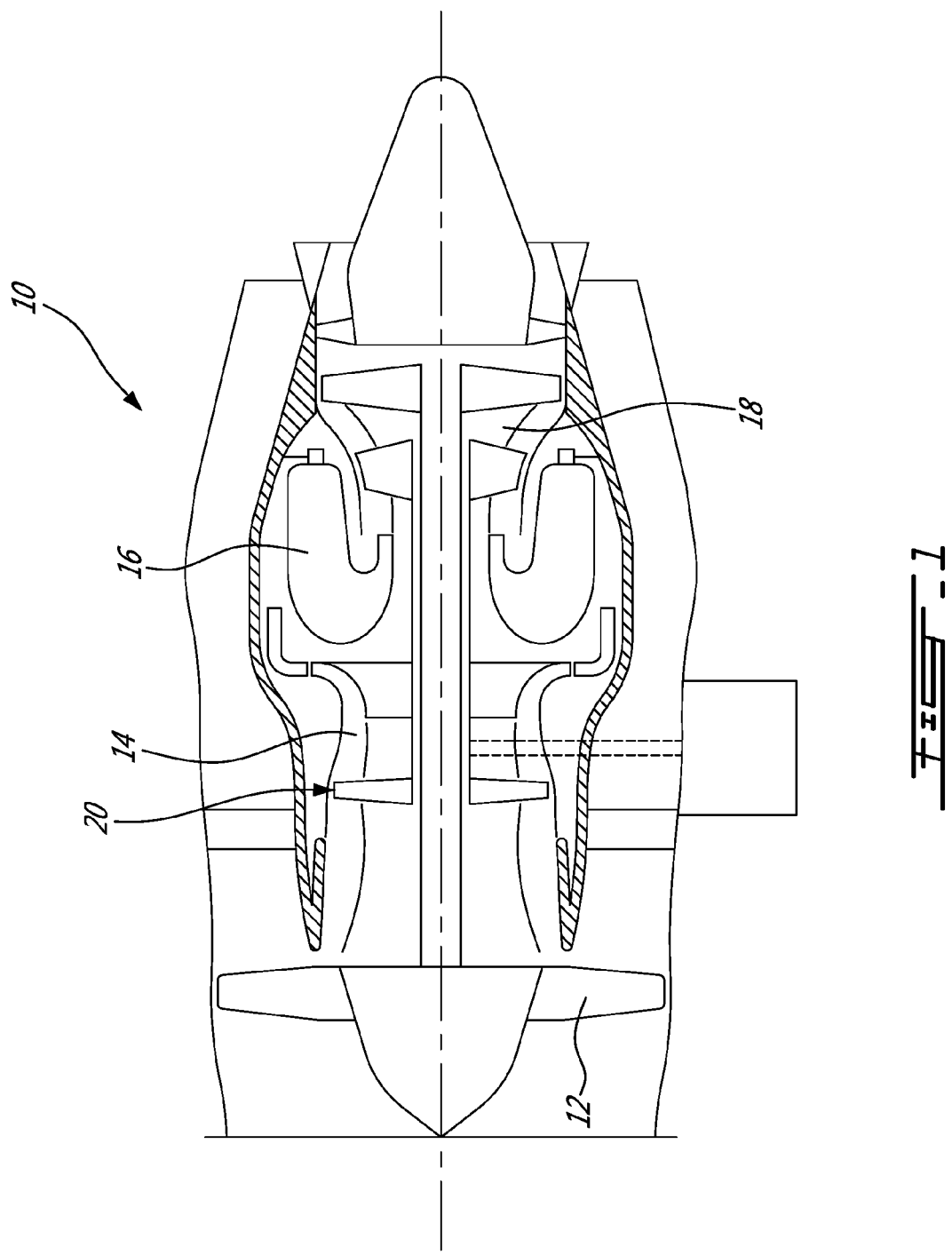

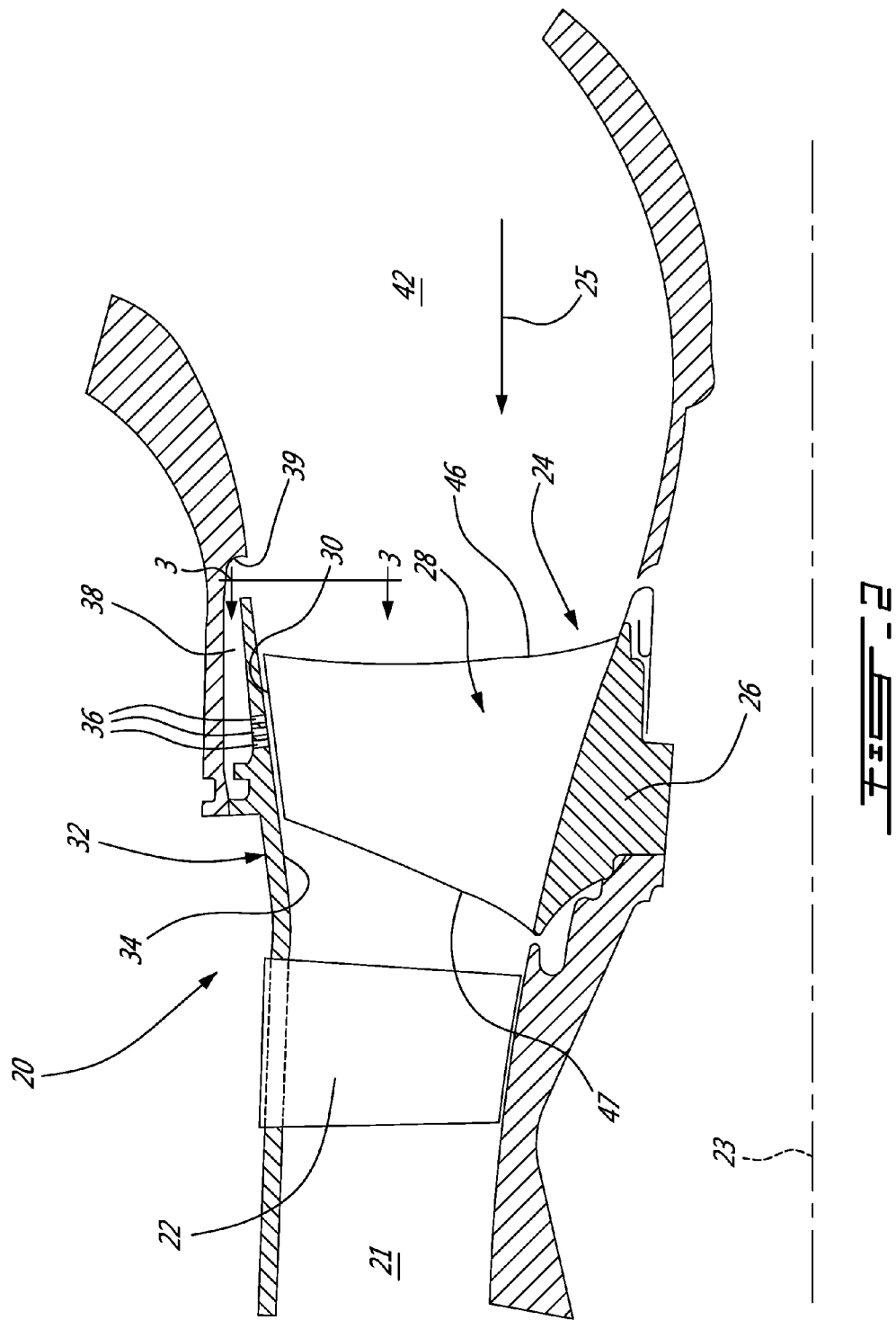

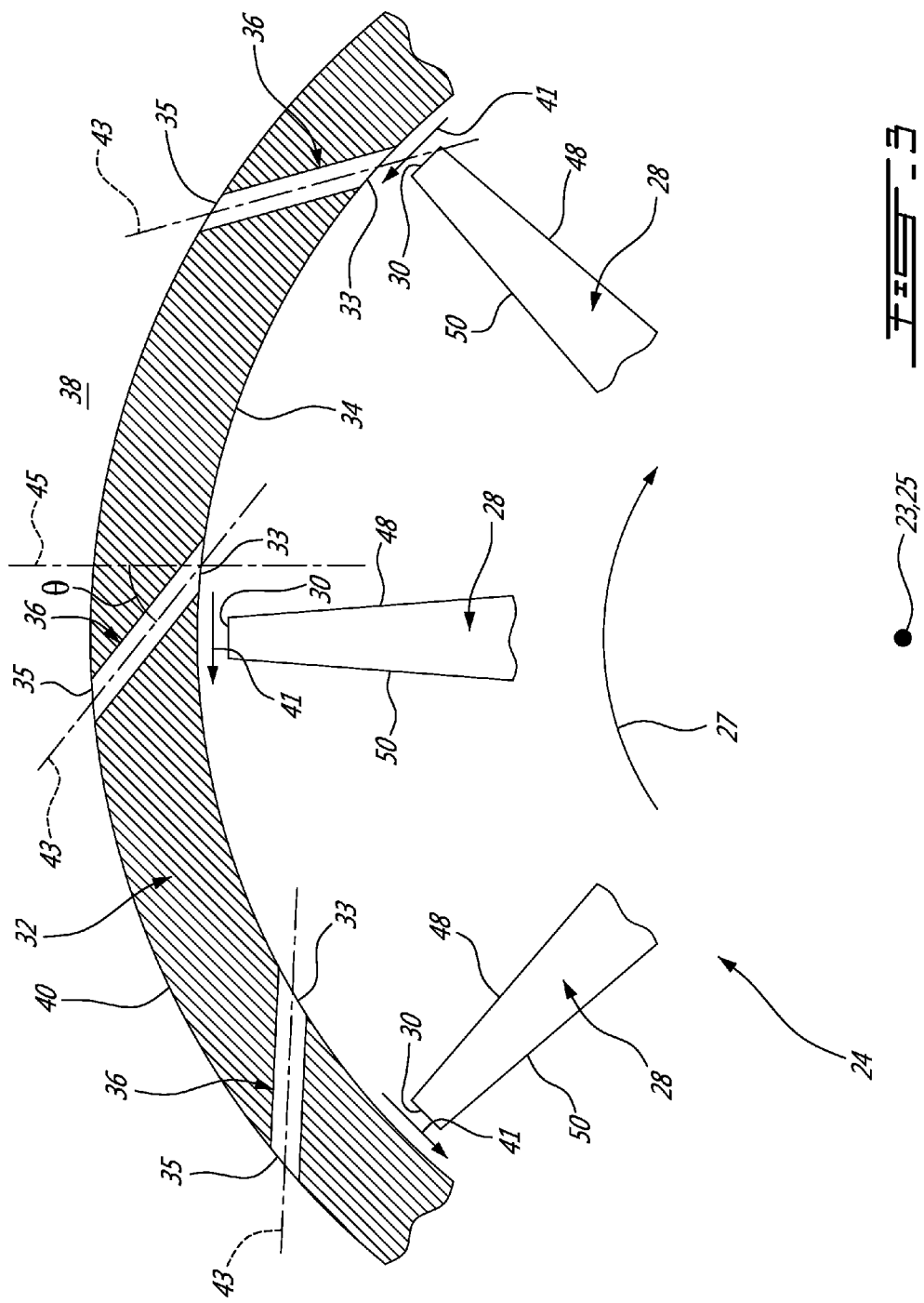

COMPRESSOR BLEED SELF-RECIRCULATING SYSTEM

TECHNICAL FIELD

The present disclosure relates generally to gas turbine engines, and more particularly to gas turbine engine compressors.

BACKGROUND

In a compressor, low momentum flow along the outer shroud of the compressor is known to be detrimental to the aerodynamic performance or to trigger premature rotor stall. Accordingly, bleeding such low momentum air flow at the shroud is performed to improve engine performance and operability.

Further, recirculation and reintroduction of the air which bled off back into the compressor flow has been found advantageous to improve the stall margin of the compressor. However, stall margin improvement by such known recirculation systems typically comes at the expense of performance loss. Improvement is therefore sought.

SUMMARY

There is provided a compressor for a gas turbine engine comprising: a rotor having hub defining a central axis of rotation and a plurality of blades radially extending from the hub to project into an annular main gas flow passage of said compressor, each of said blades having a remote blade tip and a leading edge defined between opposed pressure and suction surfaces, said rotor being rotatable about said axis of rotation; an annular shroud circumferentially surrounding the rotor and having a radially inner surface adjacent to the blade tips, the inner surface of the shroud facing said main gas flow passage; and a bleed air recirculation system including: a plurality of bleed holes extending through the shroud at a first axial location thereon substantially adjacent the blade tips, each of the bleed holes having a closed outer perimeter along a complete length thereof defined between an inlet opening and an outlet opening of the bleed hole; and an annular bleed cavity surrounding the shroud and disposed in gas flow communication with the outlet openings of the bleed holes, the bleed holes defining inlet passages to the annular bleed cavity and providing gas flow communication between said main gas flow passage and the bleed cavity, the bleed cavity having one or more exit passages having outlets thereof disposed in said shroud at a second axial location thereon, the second axial location being disposed upstream of the first axial location and upstream of the leading edge of the blades of the rotor; wherein, in use, a pressure differential existing between the bleed holes and the bleed cavity exit passage outlets circulates a portion of gas flow in the main gas flow passage through the bleed cavity, said portion being fed into the bleed cavity via the bleed holes, and re-injects said portion in the bleed cavity back into the main gas flow passage at the second axial location upstream of both the bleed holes and the leading edge of the blades of the rotor.

There is also provided a gas turbine engine comprising: a compressor section, a combustor and a turbine section, in serial flow communication; and the compressor section having at least one axial compressor including: an axial rotor having a hub defining a central axis of rotation and a plurality of blades radially extending from the hub to project into an annular gas flow passage of the compressor, each of said blades having a remote blade tip and a leading edge defined between opposed pressure and suction surfaces of the blades, said rotor being rotatable about said axis of rotation; a shroud circumferentially surrounding the rotor and having a radially inner surface adjacent to the blade tips, the inner surface of the shroud facing and radially enclosing said annular gas flow passage; and a plurality of bleed holes extending through the shroud at a first axial location thereon substantially adjacent the blade tips, each of the bleed holes having a closed outer perimeter along a complete length thereof defined between an inlet opening and an outlet opening of the bleed hole; and an annular bleed cavity surrounding the shroud and disposed in gas flow communication with the outlet openings of the bleed holes, the bleed holes defining inlet passages to the annular bleed cavity and providing gas flow communication between said main gas flow passage and the bleed cavity, the bleed cavity having one or more exit passages having outlets thereof disposed in said shroud at a second axial location thereon, the second axial location being disposed upstream of the first axial location and upstream of the leading edge of the blades of the rotor; wherein, in use, a pressure differential existing between the bleed holes and the bleed cavity exit passage outlets draws a portion of gas flow in the main gas flow passage into the bleed cavity via the bleed holes and re-injects said portion in the bleed cavity back into the main gas flow passage at the second axial location upstream of both the bleed holes and the leading edge of the blades of the rotor.

There is further provided a method of bleeding tip leakage flow from a gas turbine engine compressor comprising: providing a rotor rotatable about an axis of rotation within an outer shroud surrounding said rotor, the rotor having a plurality of radially projecting blades extending into an annular gas flow passage of the compressor, the annular gas flow passage being radially enclosed by an inner surface of the outer shroud, each of said blades having a remote blade tip and a leading edge defined between opposed pressure and suction surfaces, the inner surface of the shroud being adjacent to the blade tips and radially enclosing said annular gas flow passage; rotating said rotor to generate a main compressor flow within the annular gas flow passage in a first rotational direction corresponding to a direction of rotation of the rotor, a tip leakage flow being formed between the blade tips and the inner surface of the shroud, the tip leakage flow being in a direction opposite to the direction of rotation of the rotor; and bleeding off at least a portion of the tip leakage flow using a plurality of bleed holes through which bleed air flows, the bleed holes extending through the shroud at a first axial location thereon substantially adjacent the blade tips, each of the bleed holes having a closed outer perimeter along a complete length thereof defined between an inlet opening and an outlet opening of the bleed hole; and recirculating and re-injecting the bleed air back into the annular gas flow passage of the compressor via bleed exit passage outlets located at an axial location disposed upstream of both the bleed holes and the leading edge of the blades of the rotor, wherein the recirculation of the bleed air is at least partially driven by a pressure differential between the bleed holes and the bleed cavity exit passage outlets.

Further details of these and other aspects of the present invention will be apparent from the detailed description and figures included below.

BRIEF DESCRIPTION OF THE DRAWINGS

Reference is now made to the accompanying figures, in which:

FIG. 1 is a schematic cross-sectional view of a gas turbine engine;

FIG. 2 is a partial cross-sectional view of a compressor of the gas turbine engine of FIG. 1;

FIG. 3 is schematic front cross-sectional view, taken along line 3-3 of FIG. 2;

DETAILED DESCRIPTION

Figure 3A:
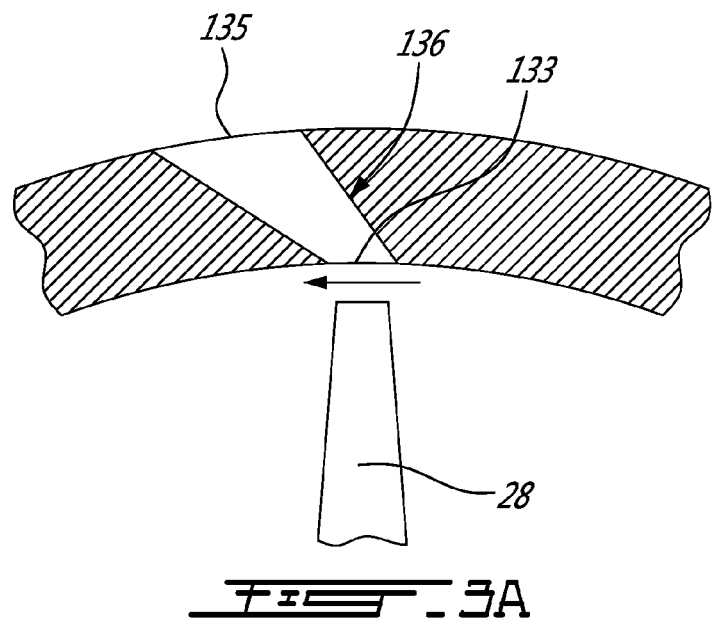
FIG. 3A is a partial cross-sectional view of a compressor shroud of the gas turbine engine of FIG. 1, having a bleed hole therein in accordance with an alternate embodiment.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. The multistage compressor section 14 includes an axial compressor 20, as will be further described. Although a turbofan engine is depicted and described herein, it will be understood however that the gas turbine engine 10 may comprise other types of gas turbine engines such as a turbo-shaft, a turbo-prop, or auxiliary power units.

The compressor section 14 of the gas turbine engine 10 may be a multi-stage compressor, and thus may comprise several axial and/or centrifugal compressors. Although the present disclosure will focus on an axial compressor 20, i.e. having an axial turbo machine rotor, it is to be understood that the compressor 20 as described herein may also be a centrifugal compressor and/or a mixed flow rotor.

Figure 4:
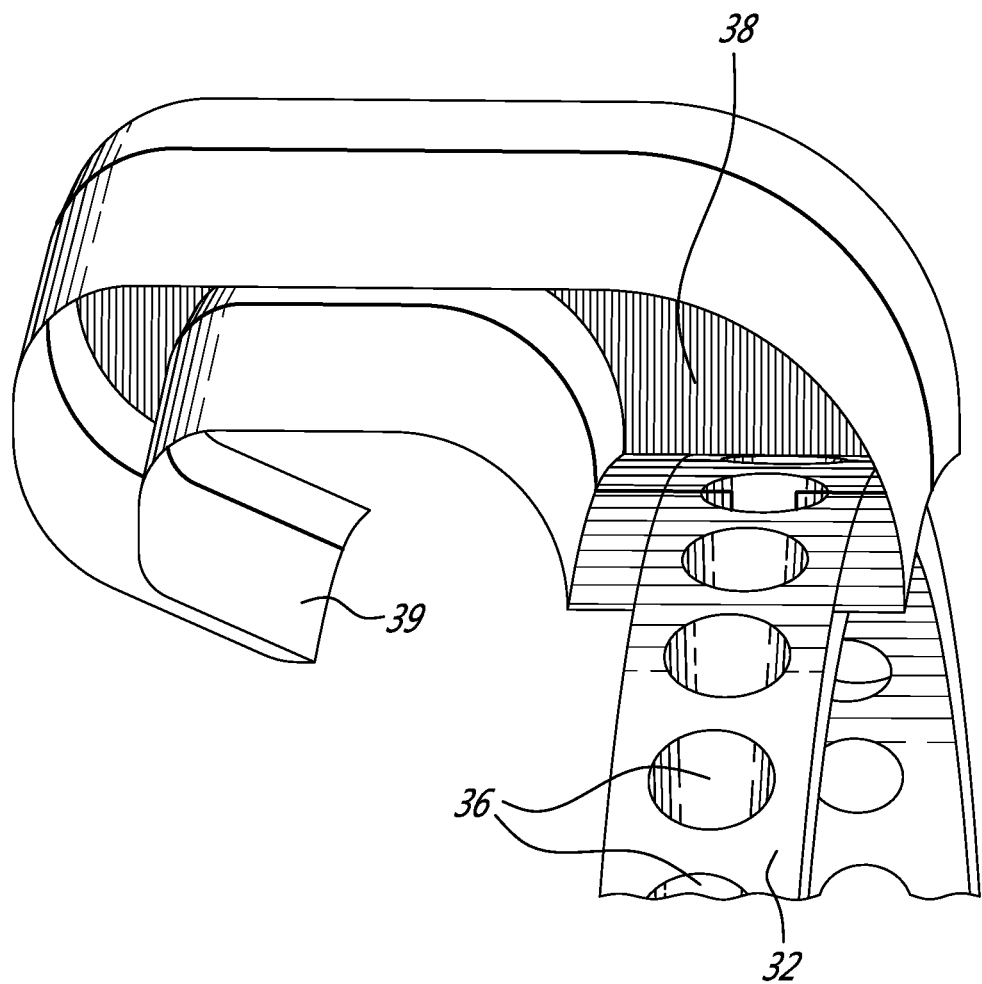
FIG. 4 is a partial perspective view of the compressor shroud of FIG. 2, showing the bleed holes therein.

Referring to FIGS. 2 and 4, an axial compressor 20 of the compressor section 14 comprises generally a rotor 24 and a stator 22 downstream relative thereto, each having a plurality of blades defined within the gas flow path which is defined by the compressor inlet passage 42 upstream of the rotor 24 and the compressor discharge passage 21 downstream of the stator 22. The gas flowing in direction 25 is accordingly fed to the compressor 20 via the compressor inlet passage 42 and exits therefrom via the compressor discharge passage 21. The rotor 24 rotates about a central axis of rotation 23 within the stationary and circumferentially extending outer shroud 32, the radially inwardly facing wall 34 of which defines a radial outer boundary of the annular gas flow path through the compressor 20. The rotor 24 includes a central hub 26 and a plurality of blades 28 radially extending therefrom and terminating in blade tips 30 immediately adjacent the outer shroud 32.

The rotation of the compressor rotor 24 is shown in FIG. 3 by displacement of the rotor blades 28 in direction 27 about the central axis 23 and relative to the gas flow direction 25 which is substantially parallel to the longitudinally extending central axis 23. Each blade 28 includes a leading edge 46 and a trailing edge 47, and, as best seen in FIG. 3, includes a pressure surface, or pressure side, 48 of the blade on one side and a suction surface, or suction side, 50 of the blade, on the other side.

The stationary outer shroud 32, which extends circumferentially and radially surrounds the tips 30 of the rotor blades 28, includes a plurality of bleed holes 36 in at least a portion thereof. In one possible embodiment, the bleed holes 36 are disposed in an axial position which is substantially axially aligned with the blade tips 30 of the rotor 24, as seen in FIG. 2. However, the bleed holes 36 may also be disposed further downstream, for example just immediately downstream of the blade tips 30.

Regardless, these shroud bleed holes 36 provide fluid flow communication between the annular main compressor gas path 42, defined radially within the outer shroud 32, and a bleed cavity 38 disposed radially outward from the shroud 32 and which extends substantially annularly within the shroud 32. The bleed holes 36 thus provide air inlets to the annular bleed cavity 38. Air is therefore bled from the main compressor gas path of the compressor 20 through the bleed holes 36, and dumped into the annular bleed cavity 38. The bleed air is then forced upstream within the bleed cavity 38 by the static pressure difference upstream and downstream of the bleed cavity 38, and subsequently re-injected back into the main compressor gas flow via one or more bleed cavity exit apertures 39. The exit apertures 39 are disposed in the shroud at an axial position therein which is upstream of the leading edge 46 of the rotor blades 28. Air bleed through bleed holes 36 is thus recirculated and reintroduced back into the main compressor gas flow upstream of the compressor rotor 24.

Thus, the shroud bleed holes 36 passively bleed air from the compressor 20, more specifically via the bleed holes 36 which bleed away low momentum air flow at the shroud, and this bleed air is recirculated and reintroduced back into the main compressor gas passage 42 upstream of the rotor 24 of the compressor 20. The reinjection of the high pressure bleed flow back into the main gas passage 42 at a location upstream of the rotor 24 both reenergizes the lower momentum air flow at the blade tips 30 and helps to push any tip leakage flow 41 within the tip clearance gap further inside the blade passage and thus keeps leaking edge tip leakage flow from reaching the adjacent blade at the leading edge thereof.

This bleed air recirculation system, whereby bleed air is extracted adjacent to or downstream from the blade tips 30 via the bleed holes 36 and re-introduced back into the main gas passage upstream of the rotors blades, accordingly limits and/or prevents tip leakage from reaching adjacent compressor stages at the leading and trailing edges of the rotors thereof, which is believed to improve the stall margin of the compressor.

Compared to known recirculation systems, however, the performance loss which is typically associated with such an improved stall margin and thus operational enveloped of the compressor is limited using the bleed holes 36 of the present recirculation system.

As air is passively bled through the bleed holes 36, there is accordingly a recirculation of bleed of air from the main gas path 42 of the compressor, through the bleed holes 36, into the bleed cavity 38, out of the bleed cavity and back into the main gas passage via bleed air reinjection openings 39 located upstream of the rotor. Such a passive bleed and recirculation design allows for self regulation of the bleed flow based on flow conditions, shock properties, etc. As these can be predetermined by one skilled in the art, the necessary amount of bleed flow can be established and regulated, for example such as to bleed off substantially only low momentum flow or a shockwave-induced boundary layer from the gas path of a transonic compressor, etc.

Referring now to FIG. 3, the bleed holes 36 in the shroud 32 are circumferentially angled such that they extend therethrough in a direction which is substantially opposite to the direction of rotation of the rotor blades 28. More particularly, the bleed holes 36 each have an inlet end 33, the inlet end 33 being disposed in an inner surface 34 of the outer shroud 32 and communicating with the main gas flow passage 42, and an outlet end 35, disposed in a radially outer surface 40 of the outer shroud 32. Each bleed hole 36 extends between the inlet end 33 and the outlet end 35 thereof, and defines a central bleed hole axis 43 therethrough. This axis 43 defines the orientation of the bleed hole 36.

The outlet end 35 of each of the bleed holes 36 is located circumferentially upstream, relative to the direction 27 of rotation of the compressor rotor 24 and thus the direction of rotational flow in the main gas flow passage 42, of the inlet end 33 of the same bleed hole 36. In other words, the bleed holes 36 are disposed at an orientation and direction which is substantially opposite to a direction of flow in the main gas path, which in turn corresponds to, and is driven by, the direction of rotation 27 of the rotor 24. For example, in at least one possible embodiment, the bleed hole axis 43 the bleed holes 36 may be orientated at an angle 8 of between 25 degrees and 65 degrees (i.e. approximately 45 degrees+/− 20 degrees) relative to a radially extending reference axis 45 disposed at the inlet 33 of the bleed hole 36, as shown in FIG. 3. In the depicted embodiment, the bleed holes 36 lie in a common plane which is substantially perpendicular to the axis of rotation 23 of the rotor. The bleed holes 36 extend in both a radial and circumferential direction, i.e. in a direction defined by the bleed hole axis 43 having both a radial and a circumferential component, from the radially inner inlet ends 33 to the radially outer outlet ends 35 thereof. As such, the circumferential component of the bleed air flow through each of the bleed holes 36, when flowing from the inlet end 33 to the outlet end 35, is opposite in direction to the circumferential component of the rotational air flow in the main gas path as driven by the direction of rotation 27 of the rotor 24.

The bleed holes 36 are therefore disposed at an angle which is expressly in misalignment with the direction of gas flow in the main annular gas path, as driven by the compressor rotor 24. While somewhat counterintuitive, the fact that the bleed holes 36 are oriented at an angle that is opposite to the flow of gas in the main gas path has been found to render the bleed holes 36 more effective at removing tip leakage flow from adjacent the shroud. As seen in FIG. 3, leakage flow 41 between the tips 30 of each of the rotating blades 28 and the surrounding shroud 32 occurs during rotation of the rotor 24, and is mainly driven by pressure differential across the airfoils 28. More particularly, this leakage flow 41 occurs from pressure the side 48 to the suction side 50 of each airfoil, in the direction as shown in FIG. 3. This leakage flow 41 is therefore opposite in direction to the direction of rotation 27 of the rotor 24. It has been found that by orienting the bleed holes 36 in a direction that is opposite to the direction of rotation 27, the bleed holes 36 will therefore be more aligned with the tip leakage flow 41. As a result, the bleed holes 36 of the present compressor 20 are more effective at removing, or bleeding off, unwanted leakage flow 41, and also less disruptive to the main gas flow path within the compressor. The bleed holes 36 in the shroud 32 of the present compressor 20 therefore enable increased bleed of the undesirable tip leakage flow 41, because the orientation of the bleed holes 36 is more aligned with the leakage flow direction, and thus provides a cleaner main gas path flow at the shroud of the compressor.

By more effectively targeting and removing the tip-shroud leakage flow 41, the "reverse angled" bleed holes 36 thereby permit the overall aerodynamic performance and operability envelope of the compressor 20, and therefore of the gas turbine engine 10, to be improved. More particularly, by more effectively reducing the tip leakage flow using the reverse bleed holes 36 of the present compressor 20, a number of possible advantages may be possible, including for example only one or more of the following: performance improvements, leading to lower fuel consumption, more thrust and/or improved component life; improved compressor surge margin which may allow for faster engine acceleration at part speeds and better component matching at higher speeds; structural benefits such as reducing risks of shedding induced vibration and improved low cycle fatigue (LCF) life; and/or overall engine weight/cost benefits, such as extending stage operating range, improved matching between stages, shortened gaps between rows and thus potentially more compact and lower cost engines.

Preferably, but not necessarily, each of the bleed holes 36 is disposed at the same angle, i.e. the central axis 43 of each of the bleed holes 36 is orientated at the same angle relative to a common reference. In an alternate embodiment, the bleed holes 36 be oriented at different angles relative to each other. However in all cases the bleed holes 36 will be oriented such that they extend, from inlet 33 to outlet 35 thereof, in a direction that is substantially opposite to the direction of rotation flow in the main gas path of the compressor and thus opposite to the direction of rotation 27 of the rotor 24.

Further, although the bleed holes 36 may comprise a substantially circular cross-sectional perimeter (i.e. be round), bleed holes having alternately shaped cross-sectional profiles (such as oval, elliptical, for example) may also be provided, as can bleed slots extending through the shroud 32. Further, in one particular embodiment the inlet openings 33 of the bleed holes 36 are elliptical in shape, which may better accommodate the vortex breakdown shape of the gas path air which is bled off. The outlet openings 35 of the holes 36 may be either similarly elliptical in shape, or may also be circular (i.e. the cross-sectional profile/shape of the bleed hole passage may go from one shape at the inlet thereof to a different shape at the outlet thereof).

In all cases, however, the bleed holes 36 will have a closed outer perimeter along their complete length, between the inlet 33 and the outlet 35 thereof, such as to define enclosed "holes" as opposed to "slots" which have at least one opening along the lengths thereof. Further, in all cases the bleed holes 36 will be oriented such that they extend, from their inlets 33 to their outlets 35, in a direction that is substantially opposite to the direction of rotation flow in the main gas path of the compressor and thus opposite to the direction of rotation of the rotor. The bleed holes 36 may also be specifically aligned in the same direction as the tip leakage flow 41.

Figure 3B:
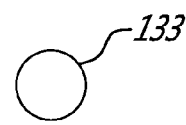
FIG. 3B is a cross-sectional view of the bleed hole as shown in FIG. 3A, taken at the inlet opening thereof.
Figure 3C:
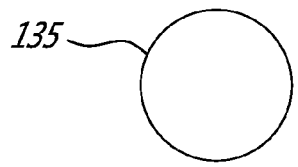
FIG. 3C is a cross-sectional view of the bleed hole as shown in FIG. 3A, taken at the outlet opening thereof.
Figure 3D:
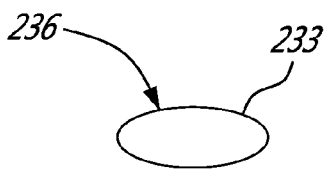
FIG. 3D is a cross-sectional view of a compressor shroud bleed hole in accordance with a further alternate embodiment, taken at the inlet opening of the bleed hole.
Figure 3E:
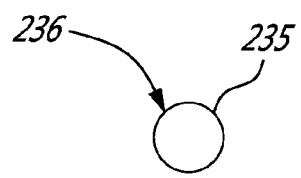
FIG. 3E is a cross-sectional view of the compressor shroud bleed hole of FIG. 3D, taken at the outlet opening of the bleed hole.

In one particular embodiment, as shown in FIGS. 3A to 3C, the bleed holes 136 are frusto-conical (i.e. non-cylindrical), and therefore have a non-constant cross-sectional area along their length. More particularly, the frusto-conical bleed holes 136 of this embodiment may be tapered in a radially outward direction, in that the cross-sectional area of the inlet 133 of the bleed holes 136 is smaller than the cross-sectional area of the outlet 135 of the bleed holes 136. Referring to FIGS. 3D to 3F, in an alternate embodiment the inlet openings and the outlet openings of the bleed holes 36, 136 need not be the same shape. For example, bleed holes 236 have an inlet opening 233 that defines a perimeter shape that is different from the outlet opening 235 thereof. More particularly, in this embodiment, the inlet opening 233 defines an elliptical perimeter shape, whereas the outlet opening 235 defines a circular perimeter shape. Alternate perimeter shapes may however also be used, for both the inlet and the outlet openings of the bleed holes.

The bleed holes 36 may be disposed in the outer shroud 32 in a suitable pattern or arrangement, and may, for example, be disposed in a grouping such as to form a circumferential array or band of holes. Such a circumferential band of shroud bleed holes 36 may for example be axially located at a point downstream of a leading edge of the rotor blades 28 and upstream of a trailing edge 47 thereof, as shown in FIG. 2.

The above description is meant to be exemplary only, and one skilled in the art will recognize that changes may be made to the embodiments described without departing from the scope of the invention as claimed. For example, as noted above, although the embodiments described relate to an axial compressor, the compressor shroud defined herein may also be employed in a centrifugal compressor or a mixed flow rotor for example. Still other modifications which fall within the scope of the appended claims will be apparent to those skilled in the art, in light of a review of this disclosure.

The invention claimed is:

1. A compressor for a gas turbine engine comprising:
   a rotor having a hub defining a central axis of rotation and a plurality of blades radially extending from the hub to project into an annular main gas flow passage of said compressor, each of said blades having a remote blade tip and a leading edge defined between opposed pressure and suction surfaces, said rotor being rotatable about said axis of rotation;
   an annular shroud circumferentially surrounding the rotor and having a radially inner surface adjacent to the blade tips, the inner surface of the shroud facing said main gas flow passage; and
   a bleed air recirculation system including:
      a plurality of bleed holes linearly extending through the shroud at a first axial location thereon substantially adjacent the blade tips, each of the bleed holes having a closed outer perimeter along a complete length thereof defined between an inlet opening and an outlet opening of the bleed hole, a linear bleed hole axis extending along the complete length between a center of the inlet opening and a center of the outlet opening of each said bleed hole, the inlet opening of each bleed hole being disposed in the radially inner surface of the shroud adjacent the blade tips and the outlet opening being disposed in a radially outer surface of the shroud, the bleed air flowing through the bleed holes from the inlet opening to the outlet opening, the outlet opening of each of the bleed holes being located circumferentially upstream of the inlet opening relative to a direction of rotational flow in the main gas flow passage as driven by a direction of rotation of the rotor, such that the linear bleed hole axis is disposed at an acute angle relative to a radially extending reference axis disposed at the inlet opening of the bleed hole; and
      an annular bleed cavity surrounding the shroud and disposed in gas flow communication with the outlet openings of the bleed holes, the bleed holes defining inlet passages to the annular bleed cavity and providing gas flow communication between said main gas flow passage and the bleed cavity, the bleed cavity having one or more exit passages having outlets thereof disposed in said shroud at a second axial location thereon, the second axial location being disposed upstream of the first axial location and upstream of the leading edge of the blades of the rotor;
   wherein, in use, a pressure differential existing between the bleed holes and the bleed cavity exit passage outlets circulates a portion of gas flow in the main gas flow passage through the bleed cavity, said portion being fed into the bleed cavity via the bleed holes, and re-injects said portion in the bleed cavity back into the main gas flow passage at the second axial location upstream of both the bleed holes and the leading edge of the blades of the rotor.

2. The compressor as defined in claim 1, wherein each of the bleed holes has a non-constant cross-sectional area along said length thereof.

3. The compressor as defined in claim 2, wherein the bleed holes are frusto-conical.

4. The compressor as defined in claim 3, wherein the inlet openings of the frusto-conical bleed holes define a first cross-sectional area and the outlet openings thereof define a second cross-sectional area, the second cross-sectional area being greater than the first cross-sectional area to thereby define a radially inwardly tapered bleed hole.

5. The compressor as defined in claim 1, wherein the bleed holes have a substantially circular cross-sectional perimeter.

6. The compressor as defined in claim 1, wherein the inlet opening and the outlet opening of each of the bleed holes define different perimeter shapes.

7. The compressor as defined in claim 1, wherein the inlet opening of the bleed holes has an elliptical perimeter shape.

8. The compressor as defined in claim 1, wherein the bleed hole axis define a bleed path along which the bleed air flows from the inlet end to the outlet end of the bleed holes, the bleed hole axis and therefore the bleed air having both a radial and a circumferential component, the circumferential component being opposite in direction to a circumferential component of the rotational flow in the main gas flow passage.

9. The compressor as defined in claim 1, wherein the bleed holes are in substantial alignment with a direction of tip leakage air flow formed radially between the blade tips of the rotor blades and the inner surface of the shroud.

10. The compressor as defined in claim 1, wherein the acute angle defined between the linear bleed hole axis and the radially extending reference axis is between 25 and 65 degrees.

11. A gas turbine engine comprising:
    a compressor section, a combustor and a turbine section, in serial flow communication; and
    the compressor section having at least one axial compressor including:
       an axial rotor having a hub defining a central axis of rotation and a plurality of blades radially extending from the hub to project into an annular gas flow passage of the compressor, each of said blades having a remote blade tip and a leading edge defined between opposed pressure and suction surfaces of the blades, said rotor being rotatable about said axis of rotation;

a shroud circumferentially surrounding the rotor and having a radially inner surface adjacent to the blade tips, the inner surface of the shroud facing and radially enclosing said annular gas flow passage; and a plurality of bleed holes extending through the shroud at a first axial location thereon substantially adjacent the blade tips, each of the bleed holes having a closed outer perimeter along a complete length thereof defined between an inlet opening and an outlet opening of the bleed hole, a linear bleed hole axis extending along the complete length between a center of the inlet opening and a center of the outlet opening of each bleed hole, the inlet opening of each bleed hole being disposed in the radially inner surface of the shroud adjacent the blade tips and the outlet opening being disposed in a radially outer surface of the shroud, the bleed air flowing through the bleed holes from the inlet opening to the outlet opening, the outlet opening of each of the bleed holes being located circumferentially upstream of the inlet opening relative to a direction of rotational flow in the main gas flow passage as driven by a direction of rotation of the rotor, such that the linear bleed hole axis is disposed at an acute angle relative to a radially extending reference axis disposed at the inlet opening of the bleed hole; and an annular bleed cavity surrounding the shroud and disposed in gas flow communication with the outlet openings of the bleed holes, the bleed holes defining inlet passages to the annular bleed cavity and providing gas flow communication between said main gas flow passage and the bleed cavity, the bleed cavity having one or more exit passages having outlets thereof disposed in said shroud at a second axial location thereon, the second axial location being disposed upstream of the first axial location and upstream of the leading edge of the blades of the rotor;

wherein, in use, a pressure differential existing between the bleed holes and the bleed cavity exit passage outlets draws a portion of gas flow in the main gas flow passage into the bleed cavity via the bleed holes and re-injects said portion in the bleed cavity back into the main gas flow passage at the second axial location upstream of both the bleed holes and the leading edge of the blades of the rotor.

12. The gas turbine engine as defined in claim 11, wherein each of the bleed holes has a non-constant cross-sectional area along said length thereof.

13. The gas turbine engine as defined in claim 12, wherein the bleed holes are frusto-conical.

14. The gas turbine engine as defined in claim 13, wherein the inlet openings of the frusto-conical bleed holes define a first cross-sectional area and the outlet openings thereof define a second cross-sectional area, the second cross-sectional area being greater than the first cross-sectional area to thereby define a radially inwardly tapered bleed hole.

15. The gas turbine engine as defined in claim 11, wherein the bleed holes have a substantially circular cross-sectional perimeter.

16. The gas turbine engine as defined in claim 11, wherein the inlet opening and the outlet opening of each of the bleed holes define different perimeter shapes.

17. The gas turbine engine as defined in claim 11, wherein the inlet opening of the bleed holes has an elliptical perimeter shape.

18. The gas turbine engine as defined in claim 11, wherein the bleed hole axis defining a bleed path along which the bleed air flows from the inlet end to the outlet end of the bleed holes, the bleed hole axis and therefore the bleed air having both a radial and a circumferential component, the circumferential component being opposite in direction to a circumferential component of the rotational flow in the main gas flow passage.

19. The gas turbine engine as defined in claim 11, wherein the acute angle defined between the linear bleed hole axis and the radially extending reference axis is between 25 and 65 degrees.

20. A method of bleeding tip leakage flow from a gas turbine engine compressor comprising:

providing a rotor rotatable about an axis of rotation within an outer shroud surrounding said rotor, the rotor having a plurality of radially projecting blades extending into an annular gas flow passage of the compressor, the annular gas flow passage being radially enclosed by an inner surface of the outer shroud, each of said blades having a remote blade tip and a leading edge defined between opposed pressure and suction surfaces, the inner surface of the shroud being adjacent to the blade tips and radially enclosing said annular gas flow passage;

rotating said rotor to generate a main compressor flow within the annular gas flow passage in a first rotational direction corresponding to a direction of rotation of the rotor, a tip leakage flow being formed between the blade tips and the inner surface of the shroud, the tip leakage flow being in a direction opposite to the direction of rotation of the rotor;

bleeding off at least a portion of the tip leakage flow using a plurality of bleed holes through which bleed air flows, the bleed holes extending through the shroud at a first axial location thereon substantially adjacent the blade tips, each of the bleed holes having a closed outer perimeter along a complete length thereof defined between an inlet opening and an outlet opening of the bleed hole, a linear bleed hole axis extending along the complete length between a center of the inlet opening and a center of the outlet opening of each said bleed hole, the linear bleed hole axis defining a bleed path along which the bleed air flows from the net end to the outlet end of the bleed holes, the inlet opening being disposed in the inner surface of the shroud adjacent the blade tips and the outlet opening being disposed in an outer surface of the shroud, the bleed air flowing through the bleed holes from the inlet opening to the outlet opening along the bleed path, the outlet opening of each of the bleed holes being located circumferentially upstream of the inlet opening relative to a direction of rotational flow in the main gas flow passage as driven by the direction of rotation of the rotor, such that the linear bleed hole axis is disposed at an acute angle relative to a radially extending reference axis disposed at the net opening of the bleed hole; and recirculating and re-injecting the bleed air back into the annular gas flow passage of the compressor via bleed exit passage outlets located at an axial location disposed upstream of both the bleed holes and the leading edge of the blades of the rotor, wherein the recirculation of the bleed air is at least partially driven by a pressure differential between the bleed holes and the bleed cavity exit passage outlets.

* * * * *